Aug. 8, 1939.  A. VANDERVELD  2,168,592
GEAR SHIFTING MECHANISM
Filed Feb. 7, 1938  4 Sheets—Sheet 1
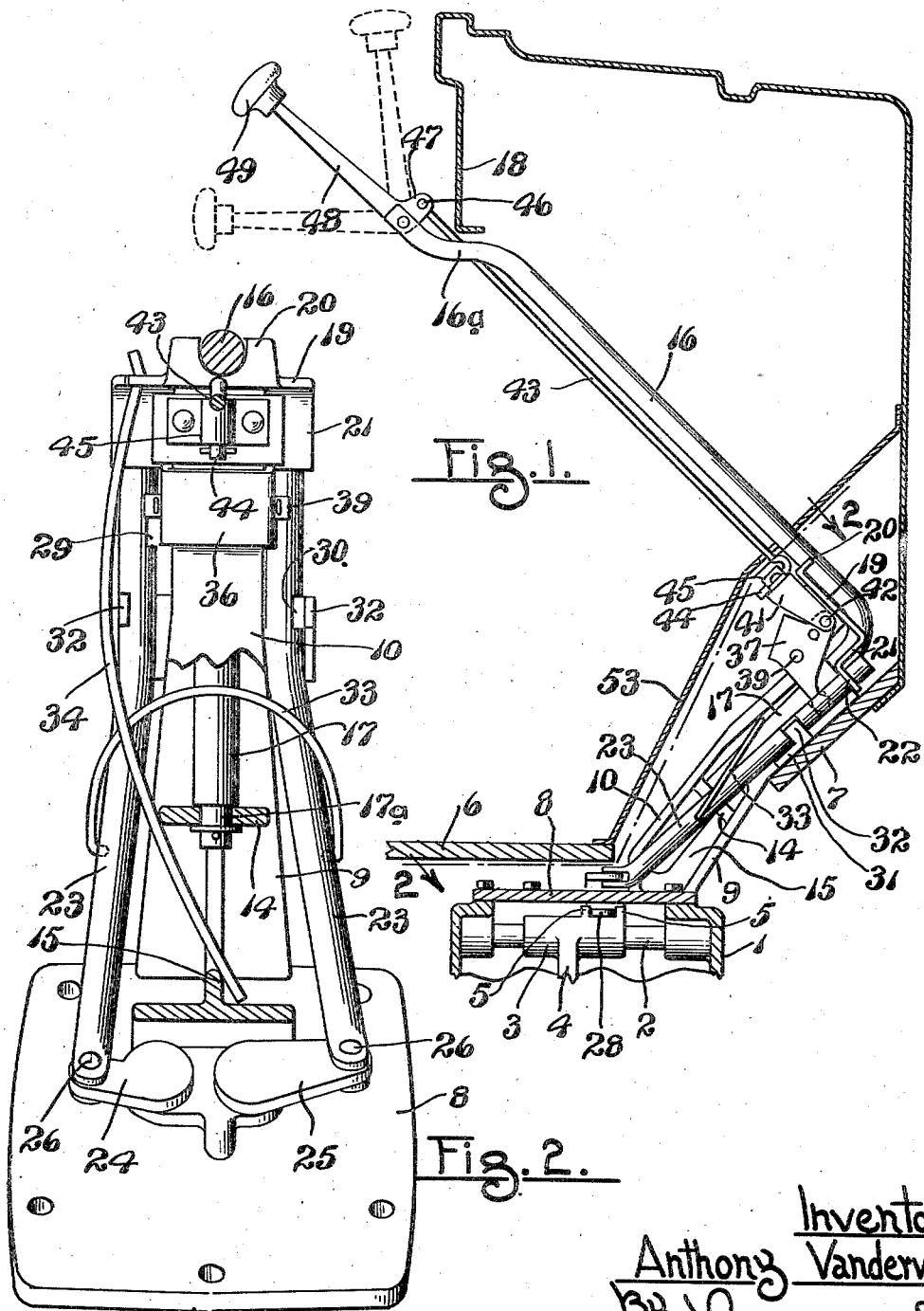
Inventor
Anthony Vanderveld
By Liverance and
Van Antwerp
Attorneys Aug. 8, 1939.  A. VANDERVELD  2,168,592
GEAR SHIFTING MECHANISM
Filed Feb. 7, 1938  4 Sheets—Sheet 2
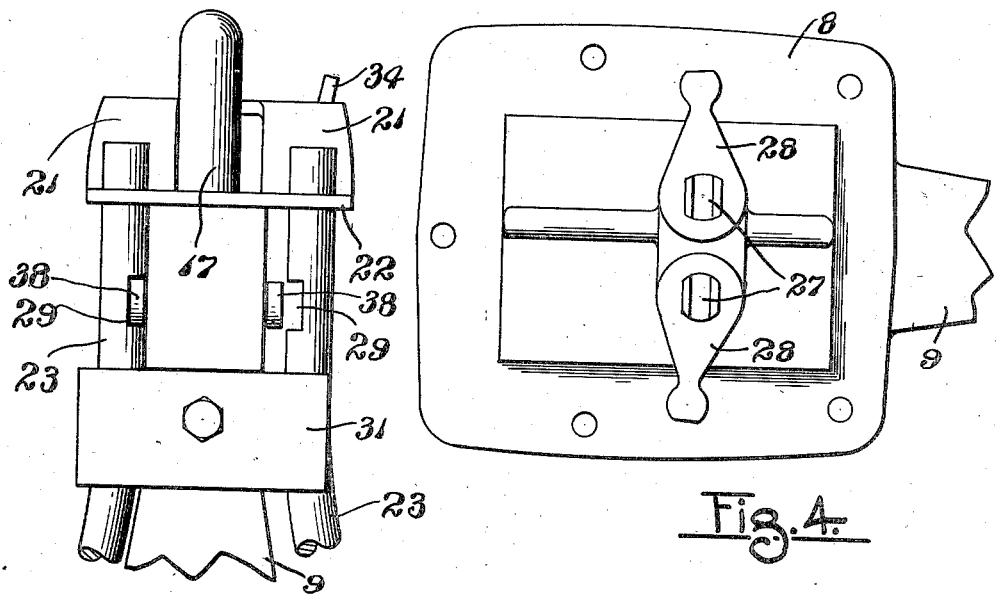
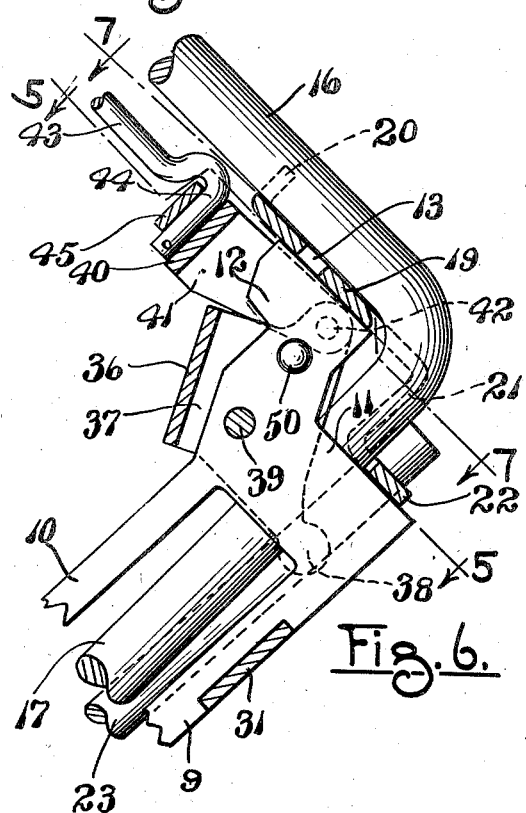
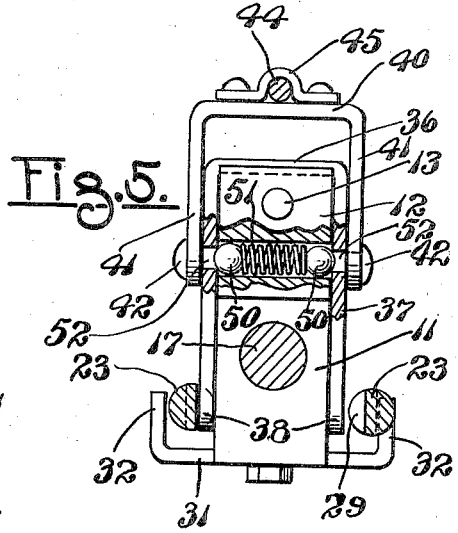
Inventor
Anthony Vanderveld
By Linerance and Van Antwerp
Attorneys Aug. 8, 1939.  A. VANDERVELD  2,168,592
GEAR SHIFTING MECHANISM
Filed Feb. 7, 1938  4 Sheets-Sheet 3
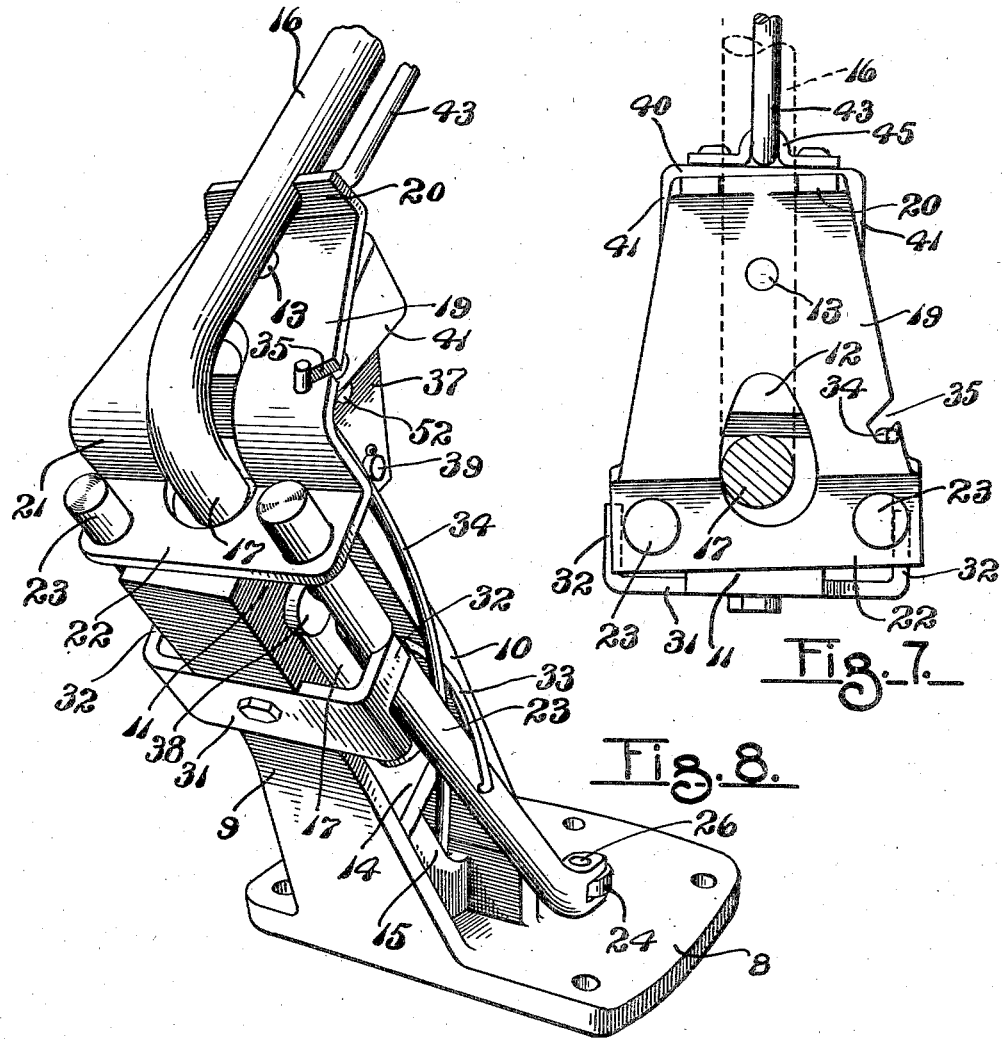
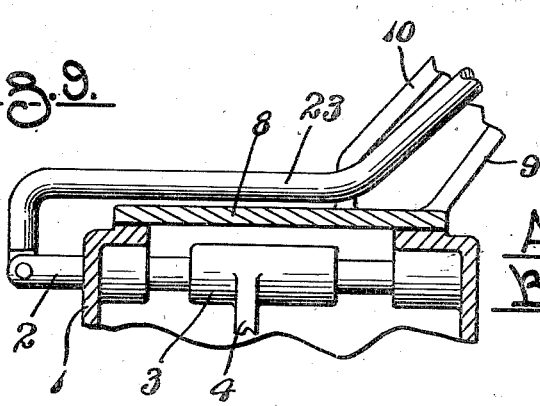
Inventor
Anthony Vanderveld
By Liverance and Van Antwerp
Attorneys

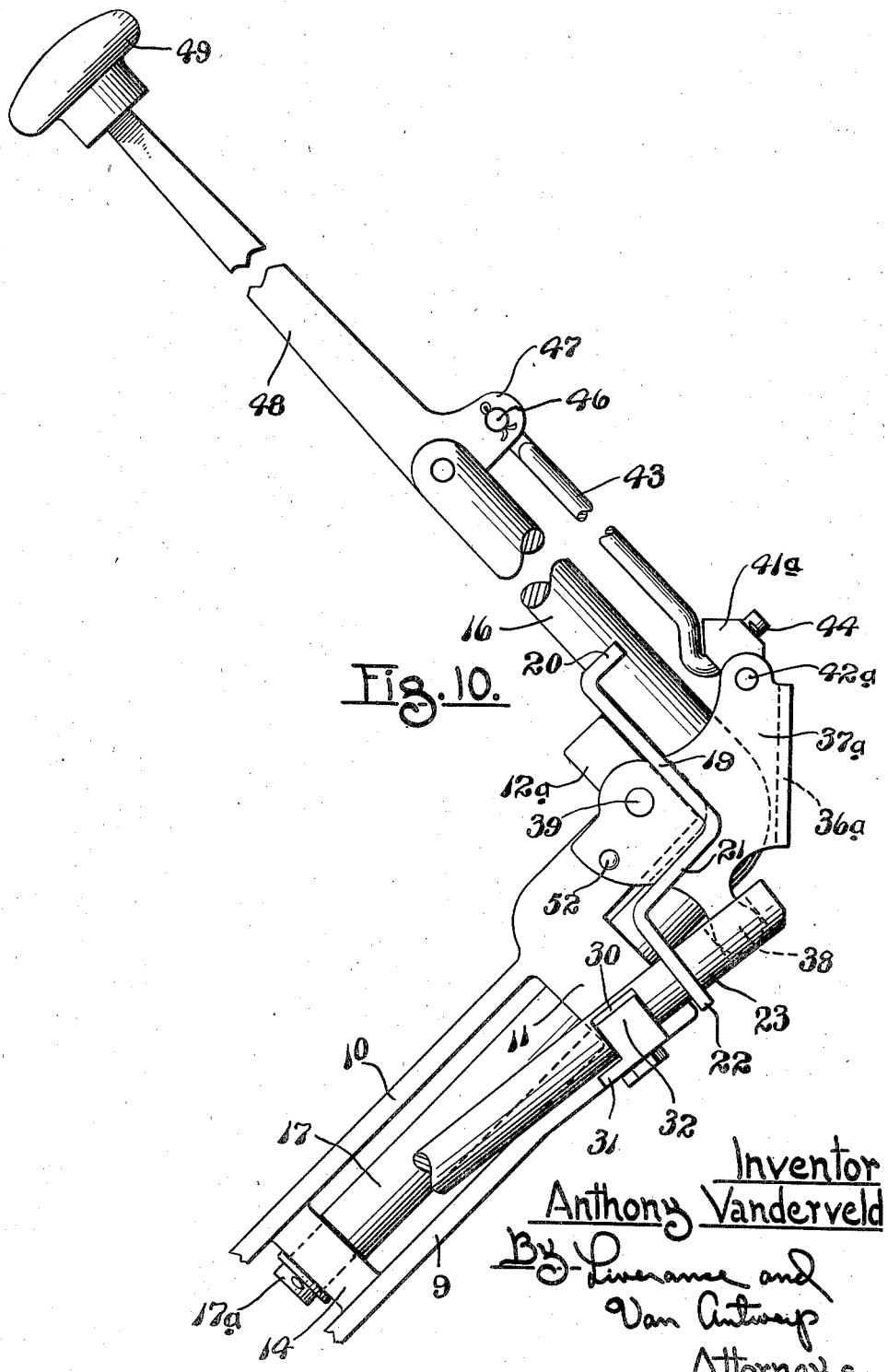

Patented Aug. 8, 1939

2,168,592

UNITED STATES PATENT OFFICE 2,168,592

GEAR SHIFTING MECHANISM

Anthony Vanderveld, Grand Rapids, Mich.

Application February 7, 1938, Serial No. 189,157

7 Claims. (Cl. 74—473)

This invention relates to a gear shifting appliance particularly adapted for shifting gears in a motor vehicle transmission.

It is well known that many millions of motor vehicles have been made in which a manually operable lever is used for shifting the gears in the automobile transmission interposed between the engine and the propeller shaft of the automobile. Such lever is located centrally of the front or driving compartment of the vehicle so that it in effect divides the front or driving compartment into two sections, one at each side of a longitudinal vertical plane positioned substantially midway between the sides of the vehicle body. This makes it difficult for more than two persons to occupy the front seat in a sedan body or the only seat in the coupe body. It is necessary or at least very desirable that entrance to the front or driving compartment should be at opposite sides of the body. And if more than two persons of adult age occupy the front or driving compartment, the one in the middle is cramped and uncomfortable, while the driver is handicapped in operating the gear shift lever with whatever attendant danger there may be because of such handicap.

Many attempts have been made to eliminate the so-called gear shift lever. But the simplicity of operation which can be performed by such lever, and other advantages which might be enumerated, are such that in general had all of the various alleged improvements in so-called automatic gear shifting, power shifting, clutch pedal shifting, electric shifting and the like been first developed and used, and then the simple gear shift lever with its ready ease of operation such that it is done simply and almost instinctively and without necessity of watching then been produced, it would have been considered a real advance over the expensive, uncertain and in many cases hard to operate devices which have been attempted.

With my invention all of the simplicity of operation or actuation, and such operation or actuation in the same natural way that has been previously performed with the usual gear shift lever are retained, and at the same time the obstruction afforded by the gear shift lever is removed. Furthermore, as an advantage of my invention the structure which is used is exceptionally sturdy, yet economical to produce and its adaptation to the transmission gearing is of the simplest character, requiring only the removal of the cover plate of the transmission gear housing with the usual gear shift lever which is mounted on such cover plate being removed at the same time, and a replacement thereof by my invention which is mounted as a unit on and over the transmission gearing housing. There is no change required in the transmission gearing in any respect, and the cost of the shifting unit of my invention is in a considerable measure balanced by the cost of what is eliminated when the shifting unit of my invention replaces the transmission gearing cover plate and gear shift lever which is still used on a great many motor vehicles.

My invention is for the production of a gear shifting appliance attaining the benefits and results which have been enumerated, together with many others which will appear as an understanding of the invention is had from the following description, taken in connection with the accompanying drawings, in which:

Fig. 1 is a fragmentary vertical section and side elevation illustrating the gear shifting appliance of my invention in its environment with a motor vehicle body and showing the position and relation thereof to the transmission gearing and to the cowl and dash of the body.

Fig. 2 is a plan view, with some parts broken away and shown in section, and as appearing when looking in the direction indicated by the arrows in Fig. 1, relative to the plane of the line 2—2 of said Fig. 1.

Fig. 3 is a fragmentary enlarged underplan view of the forward portion of the gear shifting appliance.

Fig. 4 is an underplan view of the rear portion of said gear shifting appliance, or the plate portion thereof which covers the transmission gearing housing.

Fig. 5 is an elevation and section substantially on the plane of the broken line 5—5 of Fig. 6, looking in the direction indicated.

Fig. 6 is a fragmentary longitudinal vertical section and side elevation of the forward and lower portion of the gear shifting appliance of my invention.

Fig. 7 is a front elevation and section substantially on the plane of the line 7—7 of Fig. 6, looking in the direction indicated.

Fig. 8 is a perspective view of the lower portion of the gear shifting appliance of my invention.

Fig. 9 is a vertical section and elevation showing a slight difference in structure in one part thereof, and Fig. 10 is a side elevation of a slightly modified form of construction.

Like reference characters refer to like parts in the different figures of the drawings.

The transmission gearing housing at 1 is of any conventional standard design and the gearing construction within it is likewise of conventional form, including the two parallel rods 2 in the upper part of the housing on which sleeves 3 are slidably mounted, the sleeves having forks 4 extending downwardly to connect with the gears which are shifted in the usual manner. At the upper side of the sleeves are spaced projections 5 between which the immediate shifting element for each of such sleeves is positioned to be itself actuated by the manual operation of the gear shift lever. The structure of the transmission gearing is not changed in any respect with my invention applied thereto. The transmission gearing and its housing remains at the same location in the motor vehicle underneath the horizontal floor board 6 of the front driving compartment and extending partially underneath the usual upwardly and forwardly inclined front floor board 7. Such front boards are cut away at their middle portions. My invention is installed as illustrated best in Fig. 1.

With my invention a horizontal plate 8 is cast of suitable material, such as malleable iron, steel or any other metal which is sufficiently strong, and this plate has openings properly made therethrough so that the same bolts which connect the cover plate to the transmission gearing housing shall pass therethrough to secure the plate 8 in place. At the forward portion of the plate a structure integral with the plate is cast including a lower forwardly and upwardly extending side 9 and an upper approximately parallel side 10, the front ends of which are integrally joined by a connecting portion 11, from which a block 12 extends forwardly and upwardly at an angle to the horizontal, at the front face of which a short integral stud 13 projects as best shown in Fig. 6. A cross web 14 is cast between the opposed upper and lower sides 9 and 10 between the ends thereof and a strengthening rib 15 is cast integral with and projects upwardly from the upper side of the lower side 9 and back of the web 14, joining integrally with the rear end portion of the part 10.

A rod 16 has the lower end portion thereof bent at right angles as at 17. The rod 16 extends downwardly and forwardly from the adjacent the lower edge of the vertical dash 18 of the motor vehicle body underneath the cowl and is substantially, all of it, forwardly located a sufficient distance that it is not obstructive to occupants of the front or driving seat. The lower and integral section 17 is mounted for rocking movement. Said section 17 passes through a suitable opening in the part 11 and at its rear end is reduced in size, as at 17a (Fig. 2) and extends through an opening made to receive such reduced portion in the web 14, whereby the section 17 may turn about its axis, the rod 16 being swung laterally about such axis to either side of a central neutral position. The upper end portion of the lever 16 is bent as shown in a reverse curve, as at 16a, so that the extreme upper end of the rod 16 is located a short distance in front of and slightly above the lower edge of the dash 18.

A plate 19 of flat metal is pivotally or rockably mounted on the stud 13. It lies against the front face of the block 12 and extends a short distance above the upper side thereof and at its upper edge has a forwardly turned lip 20 recessed for the reception of rod 16, as best shown in Fig. 8. At its lower part the plate is curved downwardly and to the rear at 21 underneath the lower side of the block 12, and is then extended downwardly in a flange 22 which lies against the front end or face of the part 11 of the main supporting casting. As the part 17 of rod 16 extends through plate 19 and as the angle or bend between the parts 16 or 17 is approximately at the bend where the plate 19 and the section 21 join, a relatively large opening is made in the plate so that such plate may rock a limited distance about the stud 13 without being obstructed by the rod 16 or its integral extension 17.

Two shifting rods 23 are disposed, one at each side of the upwardly and forwardly projecting portion of the supporting casting, the forward ends of the rods passing freely through openings in the flange 22 (Fig. 8) and the rear end portions of the rods being bent to extend horizontal, and being divided between their upper and lower sides to receive the ends of arms 24 and 25 (Fig. 2) which have pivotal connection to the outer ends of said arms at 26. These arms have integral studs 27 which extend downwardly through suitable openings in the cover plate 8, and at their lower ends have connected thereto other arms 28 (Fig. 4) the ends of which are received between the upward projections 5 on the shifting sleeves 3 of the transmission. The rods 23 have a capability of movement back and forth substantially in the direction of their lengths, the manual effecting of which will be later described, and by such movement each rod moves its associated or connected shiftable gear in the transmission gearing, as will be readily understood by all skilled in the art.

Each of the rods 23 at its inner side and toward its front end is provided with a recess or notch 29, said notches in the two rods being directly opposite each other when the gearing is in neutral position. Each of said rods also at its outer side and back of the notches 29 is provided with a similar notch or recess 30, which notches in the two rods likewise are directly opposite each other when the gearing is in neutral position. A plate 31 is permanently secured at the under side of the member 9 (Figs. 5 and 8) and has arms 32 turned upwardly, one at each end, which are properly dimensioned that they may be readily received in the notches 30. Therefore, with the gearing in neutral position, on rocking the shaft 16 to one side the shifting rods 23 at their forward portions are moved laterally, moving one of the rods over toward the adjacent arm 32 so that it enters the notch 30 therein and locks such rod against longitudinal movement. The other rod at the opposite side is moved away from its adjacent arm 32 and is free for movement. This is illustrated in Figs. 5 and 3 and is readily apparent. A wire rod spring member 33 extends across from one rod 23 to the other underneath the part 10 (Figs. 2 and 8) the effect of which is to maintain the pivotal joints at the pivots 26 snug and reduce noise and rattle. A second wire rod spring 34 has its rear end engaged with the rib 15 and is flexed between its ends over an edge of the web 14, and at its other or forward end is received in a recess at 35 in one edge of the plate 19. Such spring therefore normally rocks the plate 19 in one direction, and in the neutral position of the gearing, moves one of the rods 23 over until its recess 30 receives the adjacent arm 32, as shown in Fig. 7. The other rod 23 which is thus wholly free from the adjacent arm 32 in practice is the one which by movement in one direction away from neutral shifts the gearing into the second forward speed and in the other direction into third or high forward speed, that is, the direct drive at which most of the operation of a motor vehicle is done.

An inverted substantially U-shaped actuating member of flat metal having an upper side 36, depending vertical sides 37, each of which terminates at its lower end in a head 38 having curved edges, is pivotally mounted on a shaft 39 (Figs. 1 and 6) toward the forward end of the supporting casting and near the upper side of the part 11. Said sides 37 extend downwardly one at each side of the part 11. In one position of the heads 38 and which they occupy when the gearing is in neutral position, they are in direct transverse alinement with the inside notches 29 of the rods 23. When the plate 19 is rocked by a sidewise operation of the rod 16 so that one of the rods 23 is locked by the adjacent arm 32 against movement, the other of said rods is moved so that its forward notch 29 receives the adjacent head 38 of the actuating member (Figs. 3 and 5).

A second inverted U-shaped member of sheet metal comprises an upper side 40 and depending vertical legs 41, the lower ends of which are pivotally connected, as at 42 with the sides 37 of the previously described actuating member whereby on an upward movement imparted to the last described U-shaped member the actuating member is rocked about the pivot 39 in a counterclockwise direction (Fig. 6); and when moved in a downward direction the rocking is in the opposite or clockwise direction. On such movement the rod 23 which is connected with the actuating member 36, 37 is shifted longitudinally, either in a forward or rearward direction, depending upon the direction of rocking movement of said actuating member.

A rod 43 of less diameter than the rod 16 lies at the rear side of and substantially paralleling said rod 16, at its lower end being formed into a hook 44 which is connected to the upper side 40 of the second U-shaped member described, by a clip 45. The rod 43 passes through an opening made at the reverse bent section 16a of the rod 16 and has a pivotal connection at 46 at its upper end to a short forwardly extending finger 47 integral with an operating handle lever 48 which is pivotally mounted at the upper end of the rod 16, and is provided with the usual and well-known hand engaging knob 49 at its upper end. The handle member 48 with the forwardly extending finger provides a bell crank lever whose pivotal movement about its pivotal mounting imparts a longitudinal movement to the rod 43, thereby rocking the rod actuating member 36, 37 and shifting the rod 23 which is connected therewith. The selection of the connection of one of the rods 23 with the immediate actuating member therefor, 36, 37, is performed by rocking the rod 16 about the axis of its lower arm portion 17. The movement of the selected rod 23 after it has been thus selected and connected is by pivotal movement of the bell crank lever member 47, 48 in a forward or rearward direction.

In Fig. 5 there is shown a ball check 50 spring-pressed by a spring 51 mounted in the block portion 12 of the supporting casting, the ball riding against one of the sides 37 of the actuating member and being received in a recess provided by an opening 52 through such side when the neutral position is reached. This releasable latch structure, in practice is ordinarily incorporated in the transmission gearing itself, and when thus incorporated it is not necessary nor desirable to incorporate it with the gear shifting appliance of my invention. But in any case, where the transmission gearing is not so provided, or if with my invention it appears better or more economical to use such releasable latch as illustrated in Fig. 5 in the appliance of my invention, such latch may be mounted on such appliance and removed from the gearing, this being a matter of choice with the manufacturer or designer.

A sheet metal cover 53 to house that part of the mechanism which projects through the floor boards is shown in Fig. 1 as secured to the floor boards and the front end of the body. It will be of a width only sufficient to encompass and cover the appliance in the manner shown and with downwardly extending sides which reach to and are attached to the floor board 7, as will be readily understood.

In the operation of a motor vehicle when the car is stopped the gearing is shifted to neutral position, as known to all skilled in the art, and also to all who drive automobiles. With the structure illustrated and described, the spring rod 34 will itself move the plate 19 and the parts associated with it so as to move the rod 23 which effects the shifting into second and third forward speeds into position to connect with the actuating member 36, 37. The spring rod at 34 need not be used if, as is the practice in some motor vehicles, the gear shift lever is to be free and loose when in neutral position; though the best modern practice is to make connection between the gear shift lever and that part of the transmission gearing, the operation of which effects a shift into either the second or third forward speeds, at neutral. The engine is started with the gearing in neutral. At such starting there is a shift either into reverse or first forward speed connection of the transmission gearing. In such case the driver grasps the knob 49 and rocks the lever 16 about its lower end portion 17 against the spring 34, thereby connecting the rod 23, the movement of which effects the shift into either reverse or first forward speed; and depending upon which of these two connections in the transmission gearing is wanted, the driver then moves the bell crank construction 48, 47 in the proper direction, forward or backward, about the pivotal connection of said lever to the upper end of the rod 16. The design which I have built and thoroughly tested operates in conformity with the so-called universal gear shift, that is, the forward movement of the bell crank lever at the upper end of the rod 16 will shift into reverse and the backward movement into first forward speed. After the car is under way the shift into second and then third forward speed is accomplished by turning the bell crank lever operating handle to its middle position, then rocking the rod 16, in which rocking there will be aid from the spring rod 34, and then turning the bell crank lever forward for second speed and later to the rear for the third or high speed wherein there is direct drive connection in the transmission gearing.

With this construction the gear shift lever is moved forward entirely out of the way in the front driving compartment of the body of the motor vehicle, and does not interfere with the feet or legs of one occupying the middle of the front seat. There is no interference with the operator in the ready operation of the shifting appliance because of such third occupant of the front seat of the vehicle. Getting into and out of the car at either side is much more easily accomplished than previously, with no crawling underneath the gear shift lever. The handle knob 49 is accessible immediately at a side of the steering wheel. The operations are exactly the same as with the present obstructing gear shift lever which ordinarily extends upward from the cover plate of the transmission gearing and at the third speed of connection of the gearing is pulled back so that the upper part of the lever is only a very short distance ahead of the seat.

In Fig. 10 the structure is somewhat modified with an accomplishment of greater compactness at the forward end of the upwardly and forwardly extending support, thus enabling the cover member shown at 53 in Fig. 1 to be reduced in height. Also with this structure the upper end of the rod 16 does not require any offset bending, as at 16a.

In the construction shown in Fig. 10, the plate 19 is mounted at the forward end of the projection or block 12a of the support upon a stud pivot as 13 in the same manner as previously described, and is operatively joined by the recessed flange 20 with the rocking rod 16 which is mounted for rocking movement on the support in the same manner as previously described. The actuating member having the sides 37a connected by a cross member 36a is mounted upon a pivot pin 39. Such actuating member is somewhat differently shaped from that comprising the parts 37 and 36 (Fig. 6) and is positioned forwardly so that the connecting part 36a between the sides 37a is forward of the rod 16, as in Fig. 10. The stirrup consisting of the sides 41 and the integral connecting part 40 in Fig. 6, is replaced by a block 41a pivotally connected to the actuating member, the hook 44 at the lower end of the rod 43 connecting with the block. Said rod 43 is located at the forward side of the rod 16 instead of at the rear, therefore extending directly to the finger 47 of hand lever 48 without the necessity of passing through any slot or opening in the rod 16 as is the case in the structure shown in Fig. 1. This actuating member has the rounded heads 38 at the lower part of each of the sides 37a, to be selectively received in recesses 29 at the inner side of the rods 23, said recesses 29 being positioned farther forward than in the first described structure. Likewise the recesses 30 in the outer sides of the rod 23 are positioned farther forward together with the cooperating bar with upwardly extending fingers 32 likewise being mounted farther forward at the lower side of the support. Because of the positioning of the actuating member in Fig. 10, as shown and described, the sides 37a thereof extend through the plate 19 which must have an opening at its intermediate portion large enough to permit such passage and further permit the limited rocking movement of the plate caused by rocking the rod 16 from one side to the other.

The operation in shifting gears, both of selecting the gear to be shifted and the movement of the immediate manually operated lever 48 which does the shifting after selection is made, is identical with the operation which has been described with reference to the structure shown in Figs. 1 to 9, inclusive. The construction is somewhat more economical to produce and presents a slightly better appearance in that the rod 43 is ahead of the rod 16 and not back of it, and the cover to be placed over the structure after it is installed in an automobile, such cover being shown at 53 in Fig. 1, may be reduced in height, occupy less space and present a more satisfactory appearance.

The construction evidently is of a very strong and sturdy type and character. It is readily produced economically, the assembly of the parts is simple and easy.

In Fig. 9 instead of the connection of the rods 23 to the shifting sleeves and forks by means of the parts 24, 25, 27 and 28, as shown in Figs. 2 and 4, it is by lengthening or extending the rods 23 horizontally at their rear portions back of the transmission gearing, turning said rods downwardly and pivotally joining them to the shifting rods 2 which are extended through the rear side of the transmission housing and back thereof. In such case the sleeves 3 will be permanently secured to the rods 2 and move therewith. This eliminates some parts of construction such as the drop forging members 24 and 25 with their connected studs 27. It eliminates the parts 28 and thereby reduces cost of production. The operation is the same as previously described.

The invention, which has been fully described, is defined in the appended claims and is to be considered comprehensive of all forms of structure coming within their scope.

I claim:

1. A gear shifting appliance adapted to be associated with the selective sliding transmission gearing of a motor vehicle comprising, a cover plate adapted to be secured over such transmission gearing, a support connected with said plate extending upwardly and forwardly therefrom, a rod pivotally mounted on said support for lateral movements to each side of a central position and extending upwardly and to the rear from the forward end of the support, a lever pivotally mounted at the upper end of the rod, means mounted on the support adapted to be connected with gears to be shifted, an actuating means, means moved by said rod on lateral movement thereof for selectively connecting the gear to be shifted with the actuating means, and means for operating said actuating means upon manual operation of said lever mounted at the upper end of said rod.

2. A gear shifting appliance adapted for selecting and operating gears in a sliding gear transmission of a motor vehicle comprising, a support, means for mounting the support adjacent the transmission gearing in fixed relation thereto, said support at its front portion extending upwardly and forwardly a distance in front of the gearing, a rod located at the front end of the support, said rod extending upwardly and to the rear, means for mounting said rod at its lower portion on the support for a limited lateral movement about an axis substantially paralleling the forwardly and upwardly inclined front portion of the support and to either side of a neutral central position, an actuating member pivotally mounted on the support, a manually operable lever mounted at the front end of said rod to turn about a horizontal axis, connections between said lever and the actuating member for swinging the actuating member about its pivot, and means for selectively connecting the actuating member with any one of a plurality of shiftable gears of the transmission, said last mentioned means being operated by pivotally moving said rod laterally to one side or the other about its mounting on the support.

3. A gear shifting appliance adapted to be associated with the selective sliding transmission gearing of a motor vehicle comprising, a support located ahead of the transmission gearing, a rod pivotally mounted solely at its lower portion on said support whereby its upper end portion may be laterally moved to either side of a central position, said rod extending upwardly and to the rear from the support, a lever pivotally mounted at the upper end of the rod, means mounted on the support adapted to be connected with gears to be shifted, an actuating means, means moved by said rod on lateral movement thereof for selectively connecting a gear to be shifted with the actuating means, and means for operating said actuating means upon manual operation of said lever at the upper end of said rod.

4. A gear shifting appliance adapted for selecting and operating gears in a sliding gear transmission of a motor vehicle comprising, a support located in front and over the transmission gearing in a substantially fixed relation thereto, a rod pivotally mounted at its lower end on the support and having its upper end swingable sidewise through a limited distance to either side of a central neutral position, a lever pivotally mounted at the upper end of the rod to swing forward and backward in relation to the rod from a central neutral position, an actuating member pivotally mounted on said support adapted to be moved by the lever, connecting rods extending from separate points on the transmission gearing toward the forward portion of the support to come adjacent to the actuating member, means operated upon the sidewise swinging of the rod to selectively connect said connecting rods to the actuating member, and interconnecting means between the lever and said actuating member to shift a selected gear upon operation of said lever.

5. A gear shifting appliance adapted to be associated with the selective sliding transmission gearing of a motor vehicle comprising, a support located ahead and above the transmission gearing, a rod pivotally mounted on the support for lateral movements to each side of a central neutral position, said rod extending upwardly and to the rear from said support, a lever pivotally mounted at the upper end of the rod, a plurality of means connected with gears to be shifted, an actuating means, means for selectively connecting the actuating means with one of said means connected with the gears upon lateral movement of the rod to one side or the other of its central position whereby the actuating means is connected with a gear selected to be shifted, and means for operating said actuating means upon manual operation of the lever mounted at the upper end of said rod.

6. In a motor vehicle having a body with a driving compartment with a vertical instrument board over and at a forward portion of said compartment and having a selective sliding gear transmission disposed substantially directly below said instrument board, a rod having an upper end portion located closely adjacent the lower edge of the instrument board, said rod extending downwardly and forwardly, means for pivotally mounting the lower end of the rod for swinging movement laterally to one side or the other of a central neutral position of the rod, the upper end of the rod being free of support by the vehicle body, a lever pivotally mounted at the upper end of the rod and swingable in an arc which is located in front of and substantially above the lower edge of said instrument board, means operated by the rod upon swinging the same laterally to either side of a central neutral position to make a selective connection with a gear to be shifted, and means connected with said lever for shifting the selected gear whereby on pivotally moving the lever in one direction after a lateral swinging movement of the rod, the selected gear is shifted in one direction and upon moving the lever in the opposite direction said gear is oppositely shifted.

7. A gear shifting appliance adapted to be associated with the selective sliding transmission gearing of a motor vehicle comprising, a support located forwardly and upwardly of the transmission gearing, a rod extending upwardly and rearwardly from the support, said rod being mounted and carried solely at its lower end and adapted to be swung laterally at its upper end portion to one side or the other of a central neutral position, a lever pivotally mounted at the upper end of the rod, means connected with said lever, said means being adapted to be connected selectively with a gear of said sliding transmission gearing upon the rod being moved laterally to either side of said central neutral position, whereby after the rod has been moved laterally to one side to make a connection with a gear to be shifted, said lever may be moved about its pivot in opposite directions from a central position to shift the selected gear in opposite directions from the neutral position of said gear.

ANTHONY VANDERVELD.